M. B. CAPEN.
CART.
APPLICATION FILED AUG. 22, 1919.
1,414,112. Patented Apr. 25, 1922.
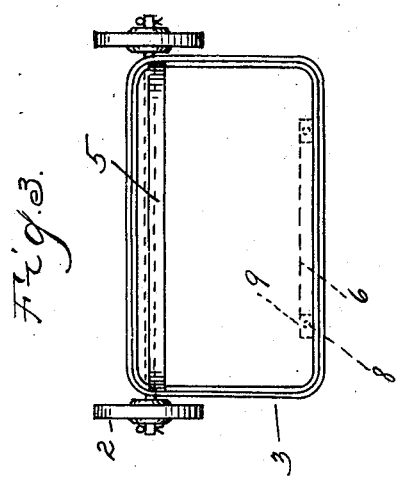
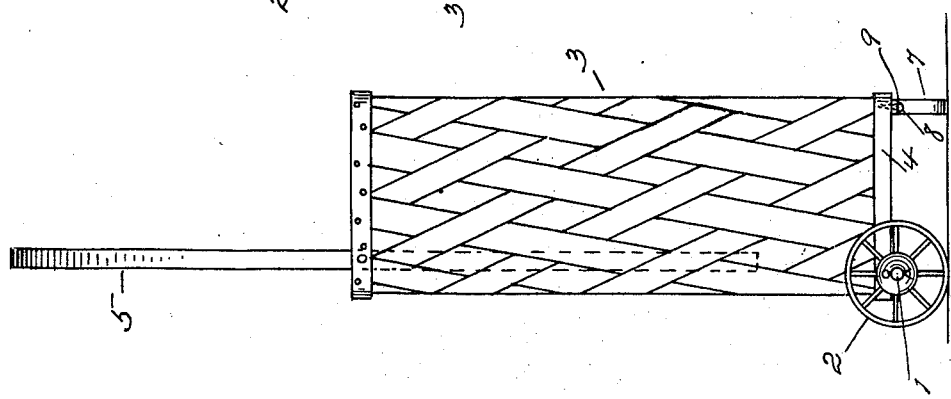
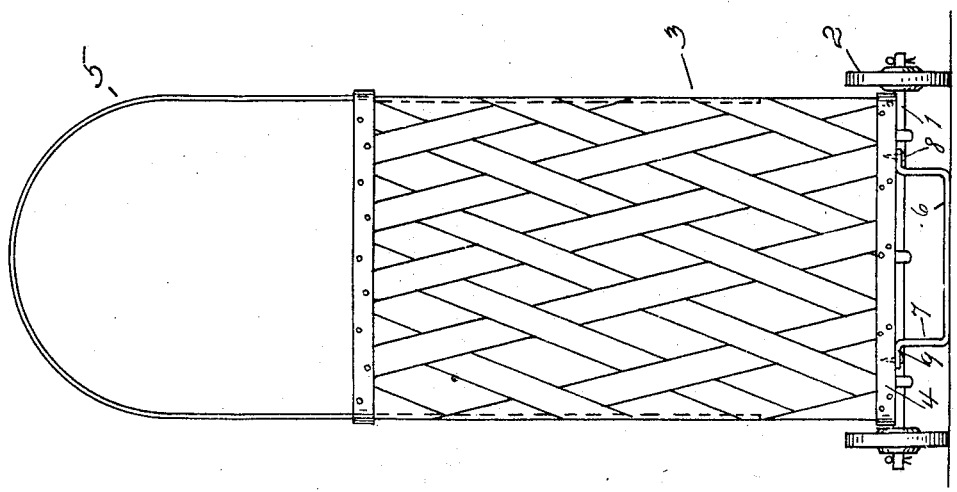
Inventor
Mary B. Capen
By Whittemore Hulbert & Whittemore
Attorneys

UNITED STATES PATENT OFFICE.

MARY B. CAPEN, OF DETROIT, MICHIGAN.

CART.

1,414,112.          Specification of Letters Patent.    Patented Apr. 25, 1922.

Application filed August 22, 1919. Serial No. 319,073.

*To all whom it may concern:*

Be it known that I, MARY B. CAPEN, a citizen of the United States of America, residing at Detroit, in the county of Wayne and State of Michigan, have invented certain new and useful Improvements in Carts, of which the following is a specification, reference being had therein to the accompanying drawings.

The invention relates to carts and has for its object the provision of a simple construction which can be cheaply manufactured and which is adapted particularly for carrying groceries or the like. Another object is the provision of means which is adapted to cooperate with the wheels of the cart to maintain the receptacle upon the wheels in substantially vertical position. Other objects of the invention reside in the novel arrangements and combinations of parts as more fully hereinafter set forth.

In the drawings:

Figure 1 is a front elevation of a construction embodying my invention;

Figure 2 is a side elevation thereof;

Figure 3 is a top plan view thereof.

1 is an axle and 2 are wheels rotatably mounted upon opposite ends of the axle. 3 is a receptacle mounted upon the axle 1 between the wheels 2. This receptacle is preferably a basket and has the base 4, which at one edge is secured to the axle, the opposite edge extending a substantial distance forward of the axle. The receptacle is of relatively great height as compared to its width, so that it is adapted to contain considerable groceries or the like, and is of a size sufficient to hold a 25lb. bag of flour.

The handle 5 is secured to the basket 3 preferably by being woven therein, this handle 5 with the basket being of a height sufficient to permit of a person moving the cart.

For the purpose of retaining the basket 3 in substantial vertical position when the cart is at rest, the rest member 6 is provided secured to the base 4 at its forward edge or the edge opposite to that secured to the axle 1. This rest member is preferably a U-shape strap, the legs 7 of which have a length approximately equal to the radius of the wheels 2. The legs are secured to the base 4 by suitable securing means 8, such as screws passing through foot flanges 9 and into the base 4.

From the above description it will be readily seen that I have provided a simple construction of cart which is sufficiently strong to carry a considerable amount of groceries or the like and is at the same time of relatively light weight. The basket 3 forms a frame work to which the handle 5 is connected so that in effect the basket and the handle form the handle connection for the cart. Furthermore, a simple arrangement is provided for retaining the basket in substantially vertical position when the cart is at rest.

What I claim as my invention is:

1. A wheeled market basket of the character described, comprising an upright basket body having an open upper end, an axle disposed at one side of the center line of said basket body and secured thereto, a pair of wheels carried by said axle and constituting a wheeled support for said basket body, means on the opposite side of the center line of said basket body constituting a rest for said basket body, said rest permitting said basket body to be tipped upon the wheels to move the rest out of contact with the ground and facilitate movement of said market basket from place to place, and a handle extending longitudinally of said market basket beyond its upper end on the side adjacent said axle for lifting and carrying the entire device, substantially as described.

2. A wheeled market basket of the character described, comprising an upright basket body forming a main frame, an axle supporting means permanently secured to said body, a pair of wheels carried by said axle and constituting a wheeled support for the basket body, said axle supporting means being disposed at one side of the center line of the basket body, means on the opposite side of the center line of the basket body constituting a rest for the body, said rest permitting the basket body to be tipped upon the wheels to move the rest out of contact with the ground and facilitate movement of the market basket from place to place, and a handle secured to and extending longitudinally of the basket beyond its upper end, on the side adjacent the axle-supporting means for lifting and carrying the entire device substantially as described.

In testimony whereof I affix my signature.

MARY B. CAPEN.